United States Patent [19]

Johansson et al.

[11] Patent Number: 4,537,581
[45] Date of Patent: Aug. 27, 1985

[54] CONE BELT TIGHTENING DEVICE

[75] Inventors: Sören Johansson, Tranås; Roger Andersson, Gränna; Lennart Jonsson, Österbymo, all of Sweden

[73] Assignee: Stiga AB, Tranas, Sweden

[21] Appl. No.: 485,996

[22] Filed: Apr. 18, 1983

[30] Foreign Application Priority Data

Apr. 30, 1982 [SE] Sweden .............................. 8202729

[51] Int. Cl.³ ................................................ F16H 7/22
[52] U.S. Cl. .................................. 474/123; 474/133; 474/135
[58] Field of Search ............... 474/101, 123, 133, 135, 474/136

[56] References Cited

U.S. PATENT DOCUMENTS

| 3,152,431 | 10/1964 | Ott et al. | 56/25.4 |
| 3,251,235 | 5/1966 | Cederberg et al. | 474/123 |
| 3,308,795 | 3/1967 | Amsbury | 474/133 X |
| 3,461,654 | 8/1969 | Plamper | 56/25.4 |
| 4,187,924 | 2/1980 | Deschamps | 180/53 |
| 4,325,210 | 4/1982 | Marto | 474/135 X |

Primary Examiner—James A. Leppink
Assistant Examiner—Frank H. McKenzie, Jr.
Attorney, Agent, or Firm—Beveridge, DeGrandi & Weilacher

[57] ABSTRACT

The present invention relates to a tightening device for cone belts and the like for use in cone belt transmissions, including at least one preferably driven cone belt pulley which is axially or substantially axially displaceable relative to at least one other, preferably driven cone belt pulley, and a cone belt interconnecting said cone belt pulleys, said tightening device engaging one run of the cone belt by means of a rotary member.

The novelty of the invention is that the tightening means includes a preferably spring-loaded support lever arranged adjacent one of the cone belt pulleys and adapted to pivot about a first axis situated substantially parallel with the cone belt pulley shaft and also about an axis oriented generally perpendicular to the first axis, and that a tightening pulley preferably provided with a cone belt groove is fitted at a free end of said support lever in order to maintain the engagement of the tightening pulley independently of any displacement of the cone belt runs caused by the relative displacement of the cone belt pulleys.

4 Claims, 2 Drawing Figures

CONE BELT TIGHTENING DEVICE

BACKGROUND OF THE INVENTION

The present invention relates to a tightening device for cone belts and the like for use in cone belt transmissions, including at least one preferably driven cone belt pulley which is axially or substantially axially displaceable relative to at least one other, preferably driving cone belt pulley, and a cone belt interconnecting said cone belt pulleys, said tightening device engaging one run of the cone belt by means of a rotary member.

In cone belt transmissions where the driving and the driven cone belt pulleys are radially non displaceable relative to one another a tightening means is required to check that the desired cone belt tension is maintained. In case the driving as well as the driven cone belt pulley are non displaceable both radially and axially the arrangement of the tightening device involves no problem. In cases where one pulley, especially the driven one, is axially displaceable, a problem arises since—if a conventional tightening pulley or wheel is used—, the belt would be subjected to non-desirable bending and risk being pulled off.

In so-called ride-on lawn mowers the drive pulley is non displaceably fitted on the lawn mower frame and the driven pulley or driven pulleys are mounted on the cutter unit which is movable up and down either in a parallel motion or along the arc of a circle. The two runs of the cone belt will thus have to be able to swing like a pendulum about a point situated adjacent the drive pulley. The tightening device is as a rule placed so as to act upon the return run of the cone belt. To compensate for the movement of the cone belt run transversely of its longitudinal direction it has earlier been suggested that a spring-loaded cylindrical roller having a length exceeding the pendulum movement of the cone belt run should be used at the engagement point but it has been found that this would not function but the cone belt would engage at one and the same peripheral line of this roller and thus be subjected to heavy breakage in the transverse sense. The desired axial travel along the tightening roller has thus not been obtained.

The invention is based on the knowledge that it is preferable to subject the cone belt to guided bending of little extent while running out from the driven pulley, passing the tightening pulley and entering the drive pulley, and characteristic of the device according to the invention is that the tightening means includes a spring-loaded support lever arranged adjacent one of the cone belt pulleys and adapted to pivot about an axis situated substantially parallel with the cone belt pulley shaft and also about an axis oriented generally tangentially relative to said pulley, and that a tightening pulley preferably provided with a cone belt groove is fitted at a free end of said support lever in order to maintain the engagement of the tightening pulley independently of any displacement of the cone belt runs caused by the relative displacement of the cone belt pulleys.

BRIEF DESCRIPTION OF THE DRAWINGS

An example of embodiment of the device according to the invention will be described more fully below with reference to the accompanying drawings, in which.

DETAILED DESCRIPTION

Figure 1:
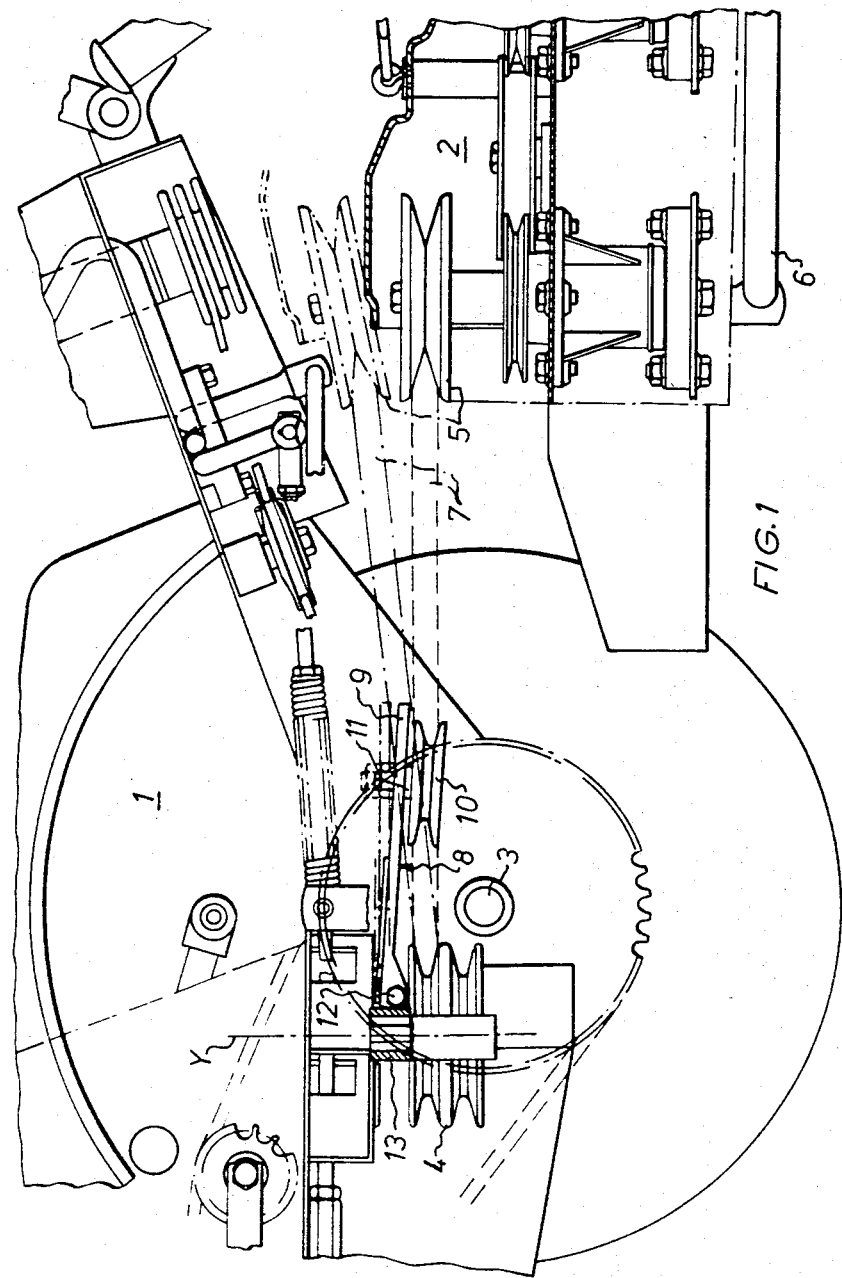
FIG. 1 is a side view of a tightening device according to the invention as applied to a ride-on mower.
Figure 2:
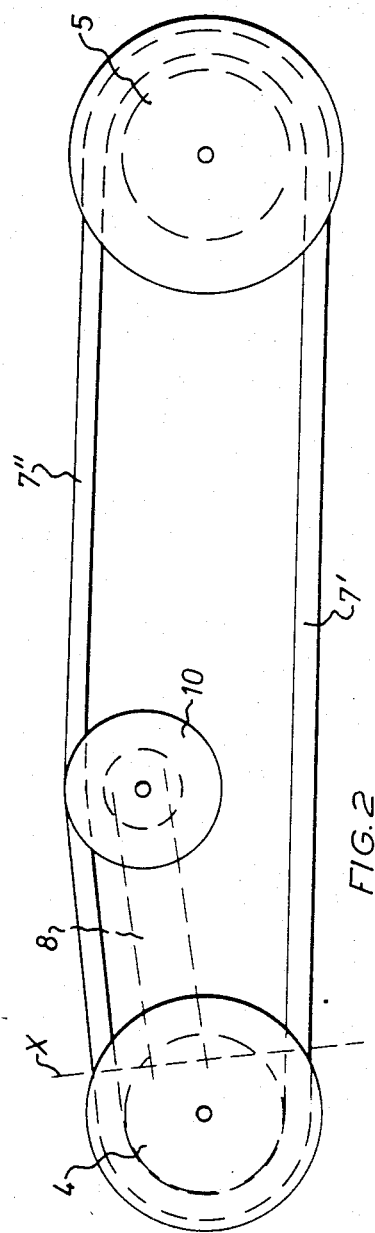
FIG. 2 is a schematical top view of the cone belt pulleys including the cone belt.

At the front of a ride-on lawn mower 1, not shown in its entirety, there is arranged a cutter unit which can be swung from a lowered working position, via various adjustment positions, up to a transport position in which the cutter unit 2 can be kept in operation.

Mounted immediately behind a front wheel axle 3 in the ride-on lawn mower is a driving cone belt pulley 4 and this is driven from a motor in a manner to be more exactly defined below. Provided adjacent the cutter unit is a driven cone belt pulley 5 which is coupled to the knives or the like 6. A cone belt 7 is arranged between the driving and driven pulleys 4 and 5.

According to the invention a support lever 8 adjacent the drive pulley 4 is adapted to pivot up and down on an axis X and by means of a journal 11. The axis X is located between the pulleys 4 and 5, and it is generally perpendicular to the axis Y described later in this specification. A tightening pulley 10 is freely rotatably mounted at the free end 9 of said lever. When the cutter unit and, consequently, the driven pulley are swung between the positions indicated by full and broken lines the belt runs 7' and 7" will pendulate up and down. The tightening pulley 10 supported by the pivotable support lever 8 and bearing against the run 7" will accompany the pendulum movement and the tension required will be secured by the application pressure on the run 7".

The support lever 8 is borne on a pin 12 which in turn is attached to a sleeve 13 adapted to pivot on an axis Y. A spring, not shown, is allowed to act upon the sleeve 13 in a per se known manner and consequently upon the support lever 8 so that this will tend to swing outwardly in a direction tightening the cone belt.

In the position shown by full lines the cone belt 7 will deflect slightly upwardly as it runs out from the driven pulley 5 and when passing the tightening pulley 10, which it merely touches, it will have a slight S-shaped deflection so as to bend in downward direction when entering on the driving pulley 4. In the raised position of the cutter assembly the deflections of the cone belt will be substantially similar but counterdirected.

As can be seen in FIG. 1, the displaceable pulley 5 is movable relative to the nondisplaceable pulley 4 along the arc of a circle, the center of which is adjacent to the shaft of pulley 4. The shaft of the displaceable pulley 5 is substantially tangent to this arc.

Although the cone belt is deflected in transverse direction tests have shown that the wear will be exceedingly small and substantially lower than when using other types of tightening means. The plausible explanation of this would seem to be that the cone belt is not deflected onesidedly and vigorously at one point but the deflection takes place in such a manner that deflection in one direction is compensated for by a principally equal deflection in the opposite direction. The changes in direction will thus compensate each other.

The invention is of course not restricted to the use herein mentioned but it may be utilized in many cases where an axial displacement of a cone belt pulley relative to another such pulley is to be counted with.

Thus the invention must not be considered restricted to that described above and shown in the drawings but may be modified in various ways within the scope of the appended claims.

What we claim and desire to secure by Letters Patent is:

1. A tightening device for cone belts and the like for use in cone belt transmissions, including at least one preferably driven cone belt pulley (5) which is axially or substantially axially displaceable relative to at least one other, preferably driving cone belt pulley (4) mounted on a shaft, and a cone belt (7) interconnecting said cone belt pulleys, said tightening device engaging one run of the cone belt by means of a rotary member, wherein the tightening means includes a preferably spring-loaded support lever (8) arranged adjacent one (4) of the cone belt pulleys and adapted to pivot about a first axis (Y) situated substantially parallel with the cone belt pulley shaft and also about a second axis (X), said second axis being located between said pulleys (4, 5) and being generally perpendicular to said first axis (Y), and a tightening pulley (10) preferably provided with a cone belt groove is fitted at a free end of said support lever (8) in order to maintain the engagement of the tightening pulley (10) independently of any displacement of the cone belt runs (7', 7'') caused by the relative displacement of the cone belt pulleys (4, 5).

2. A device as claimed in claim 1, wherein the tightening pulley (10) is adapted to engage on the inside of the belt run and to press this in outward direction.

3. A device as claimed in claim 1, wherein one cone belt pulley (7) is displaceable relative to the other (4) along the arc of a circle with the centre adjacent the shaft of the non-displaceable pulley (4), said shaft of the displaceable pulley being tangent to said arc.

4. A device as claimed in claim 2 wherein one cone belt pulley is displaceable relative to the other along the arc of a circle with the centre adjacent the shaft of the nondisplaceable pulley being tangent to said arc.

* * * * *